United States Patent
Chu et al.

(10) Patent No.: US 9,585,154 B2
(45) Date of Patent: Feb. 28, 2017

(54) DIRECT COMMUNICATION NETWORK SYSTEM FOR RESOURCE SYNCHRONIZATION COMMUNICATION

(71) Applicant: Institute For Information Industry, Taipei (TW)

(72) Inventors: Jian-Ya Chu, Taichung (TW);
Yi-Hsueh Tsai, New Taipei (TW);
Chun-Che Chien, Taipei (TW);
Hsuan-Li Lin, Taipei (TW); Shu-Tsz Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/685,890

(22) Filed: Apr. 14, 2015

(65) Prior Publication Data
US 2015/0296504 A1    Oct. 15, 2015

Related U.S. Application Data

(60) Provisional application No. 61/979,510, filed on Apr. 15, 2014.

(51) Int. Cl.
*H04B 7/00* (2006.01)
*H04W 72/04* (2009.01)
(Continued)

(52) U.S. Cl.
CPC .......... *H04W 72/048* (2013.01); *H04W 4/06* (2013.01); *H04W 56/001* (2013.01);
(Continued)

(58) Field of Classification Search
CPC ... H04W 4/06; H04W 56/001; H04W 72/048; H04W 88/04; H04W 8/005

USPC .... 455/3.05, 426.1, 552.1, 41.1, 41.2, 7, 39, 455/518, 519, 422.1, 11.1; 370/252, 315, 370/336, 328, 254, 312, 329, 330, 242; 709/205

See application file for complete search history.

(56) References Cited

U.S. PATENT DOCUMENTS 8,270,390 B2    9/2012   Kosaka
9,113,395 B2 *  8/2015   Van Phan ............. H04W 8/005
(Continued)

FOREIGN PATENT DOCUMENTS

WO    2006112328 A1   10/2006

OTHER PUBLICATIONS

Office Action to the corresponding Taiwan Patent Application rendered by the Taiwan Intellectual Property Office (TIPO) on May 17, 2016, 8 pages.

*Primary Examiner* — Tan H Trinh
(74) *Attorney, Agent, or Firm* — Skaar Ulbrich Macari, P.A.

(57) ABSTRACT

A direct communication network system for resource synchronization communication is provided. The direct communication network system includes a base station and a first user equipment. The base station broadcasts a pre-authorized setting. The first user equipment receives the pre-authorized setting and listens to a first resource synchronization message broadcasted from the base station according to the pre-authorized setting. The first user equipment directly communicates with a second user equipment according to the first resource synchronization message.

18 Claims, 14 Drawing Sheets

(51) Int. Cl.
*H04W 4/06* (2009.01)
*H04W 56/00* (2009.01)
H04W 8/00 (2009.01)
H04W 88/04 (2009.01)
H04W 48/12 (2009.01)

(52) U.S. Cl.
CPC ............ *H04W 8/005* (2013.01); *H04W 48/12* (2013.01); *H04W 88/04* (2013.01)

(56) References Cited

U.S. PATENT DOCUMENTS

| | | | |
|---|---|---|---|
| 2002/0015382 A1* | 2/2002 | Fukuda | H04L 5/023 370/208 |
| 2002/0044564 A1* | 4/2002 | Ranta | H04B 7/0617 370/436 |
| 2005/0265294 A1* | 12/2005 | Hu | H04B 7/264 370/335 |
| 2006/0146762 A1 | 7/2006 | Kuroda et al. | |
| 2006/0198352 A1* | 9/2006 | Bruck | H04H 60/06 370/347 |
| 2008/0188177 A1 | 8/2008 | Tan et al. | |
| 2008/0227392 A1* | 9/2008 | Van De Meulenhof | H04W 8/005 455/41.2 |
| 2009/0003261 A1* | 1/2009 | Kim | H04B 7/2606 370/315 |
| 2009/0325622 A1 | 12/2009 | Matsumura et al. | |
| 2011/0007692 A1* | 1/2011 | Seok | H04W 40/22 370/328 |
| 2011/0051655 A1* | 3/2011 | Blankenship | H04B 7/15557 370/315 |
| 2011/0222428 A1* | 9/2011 | Charbit | H04B 7/15557 370/252 |
| 2012/0087300 A1* | 4/2012 | Seok | H04W 76/02 370/315 |
| 2012/0309309 A1* | 12/2012 | Cho | H04W 76/023 455/41.1 |
| 2013/0039262 A1* | 2/2013 | Lim | H04B 7/155 370/315 |
| 2013/0148566 A1* | 6/2013 | Doppler | H04W 72/005 370/312 |
| 2013/0184024 A1* | 7/2013 | Chen | H04W 76/023 455/509 |
| 2013/0288694 A1* | 10/2013 | Mochizuki | H04W 72/042 455/450 |
| 2013/0336161 A1* | 12/2013 | Jung | H04W 76/023 370/254 |
| 2013/0343323 A1* | 12/2013 | Kang | H04W 72/04 370/329 |
| 2014/0010108 A1* | 1/2014 | Tavildar | H04W 8/005 370/254 |
| 2014/0017991 A1* | 1/2014 | Chang | H04W 76/00 455/7 |
| 2014/0066118 A1* | 3/2014 | Pai | H04W 4/10 455/518 |
| 2014/0133332 A1 | 5/2014 | Lee | |
| 2014/0141787 A1* | 5/2014 | Marque-Pucheu | H04W 72/005 455/447 |
| 2014/0211734 A1* | 7/2014 | Seo | H04J 11/0056 370/329 |
| 2014/0307611 A1* | 10/2014 | Tesanovic | H04W 8/005 370/312 |
| 2014/0335853 A1* | 11/2014 | Sartori | H04W 76/023 455/426.1 |
| 2015/0043545 A1* | 2/2015 | Cheng | H04W 56/00 370/336 |
| 2015/0117375 A1* | 4/2015 | Sartori | H04W 56/001 370/329 |
| 2015/0215842 A1* | 7/2015 | Lim | H04W 40/16 370/329 |
| 2015/0281860 A1* | 10/2015 | Johansson | H04R 25/606 381/326 |
| 2015/0282108 A1* | 10/2015 | Kiss | H04L 65/1006 455/435.1 |
| 2015/0296350 A1* | 10/2015 | Chu | H04W 4/08 370/312 |
| 2015/0326537 A1* | 11/2015 | Cheng | H04W 4/008 380/270 |
| 2015/0334757 A1* | 11/2015 | Seo | H04W 76/023 370/329 |

* cited by examiner

DIRECT COMMUNICATION NETWORK SYSTEM FOR RESOURCE SYNCHRONIZATION COMMUNICATION

PRIORITY

This application claims priority to U.S. Provisional Patent Application No. 61/979,510 filed on Apr. 15, 2014, which is hereby incorporated by reference in its entirety.

FIELD

The present invention relates to a direct communication network system; and more particularly, a user equipment (UE) can listen to resource synchronization information of a base station according to a pre-authorized setting to accomplish the resource synchronization in the direct communication network system of the present invention.

BACKGROUND

In the conventional direct communication system, a user equipment (UE) which desires to perform direct communication must firstly transmit a resource synchronization request to the base station. After receiving the resource synchronization request from the UE, the base station allocates an available network resource to the UE so that the direct communication is subsequently performed by the UE.

To synchronize the UE having small communication coverage with a base station, a lot of base stations may be deployed to extend the network coverage so as to receive the resource synchronization request from the UE, or alternatively, the synchronization may be accomplished by using a relay node.

However, the aforesaid solutions might lead to a significant increase of the hardware cost, and synchronization signals for resource synchronization that are transmitted by different relay nodes might cause wastes in the network resources. Moreover, in case the UE is to perform the synchronization via different relay nodes, it is impossible for the UE to accurately achieve resource synchronization mainly with a single source because the UE cannot know synchronization sources of different relay nodes.

Accordingly, efforts still have to be made in the art to overcome the shortcomings of the conventional direct communication network so as to accomplish resource synchronization communications at a low hardware deployment cost, with a high network resource utilization factor and at a high resource synchronization accuracy rate.

SUMMARY

The disclosure includes a resource synchronization communication method for a direct communication network system. The direct communication network system comprises a base station and a first user equipment (UE). The resource synchronization communication method comprises: (a) enabling the base station to broadcast a pre-authorized setting; (b) enabling the first UE to receive the pre-authorized setting; (c) enabling the first UE to listen to a first resource synchronization message broadcasted by the base station according to the pre-authorized setting; and (d) enabling the first UE to directly communicate with a second UE according to the first resource synchronization message.

Also disclosed is a direct communication network system, which comprises a base station and a first UE. The base station is configured to broadcast a pre-authorized setting. The UE is configured to: receive the pre-authorized setting; listen to a first resource synchronization message broadcasted by the base station according to the pre-authorized setting; and directly communicate with a second UE according to the first resource synchronization message.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. It shall be appreciated that these example embodiments are not intended to limit the present invention to any specific examples, embodiments, environment, applications or particular implementations described in these example embodiments. Therefore, description of these example embodiments is only for purpose of illustration rather than to limit the present invention, and the scope of this application shall be governed by the claims.

In the following embodiments and the attached drawings, elements unrelated to the present invention are omitted from depiction; and dimensional relationships among individual elements in the attached drawings are illustrated only for ease of understanding, but not to limit the actual scale.

Figure 1A:
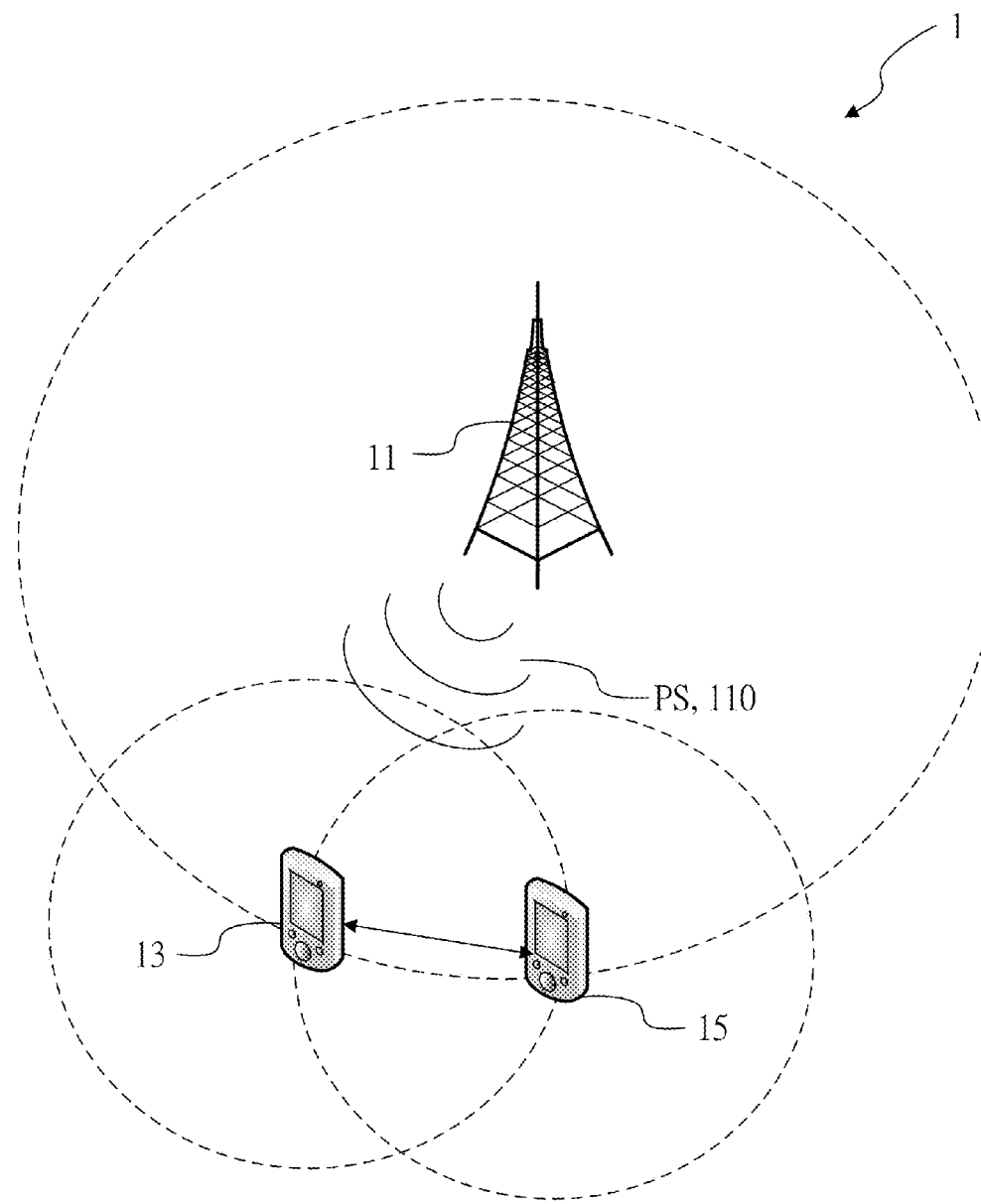
FIG. 1A is a schematic view of a direct communication network system according to a first embodiment of the present invention.
Figure 1B:
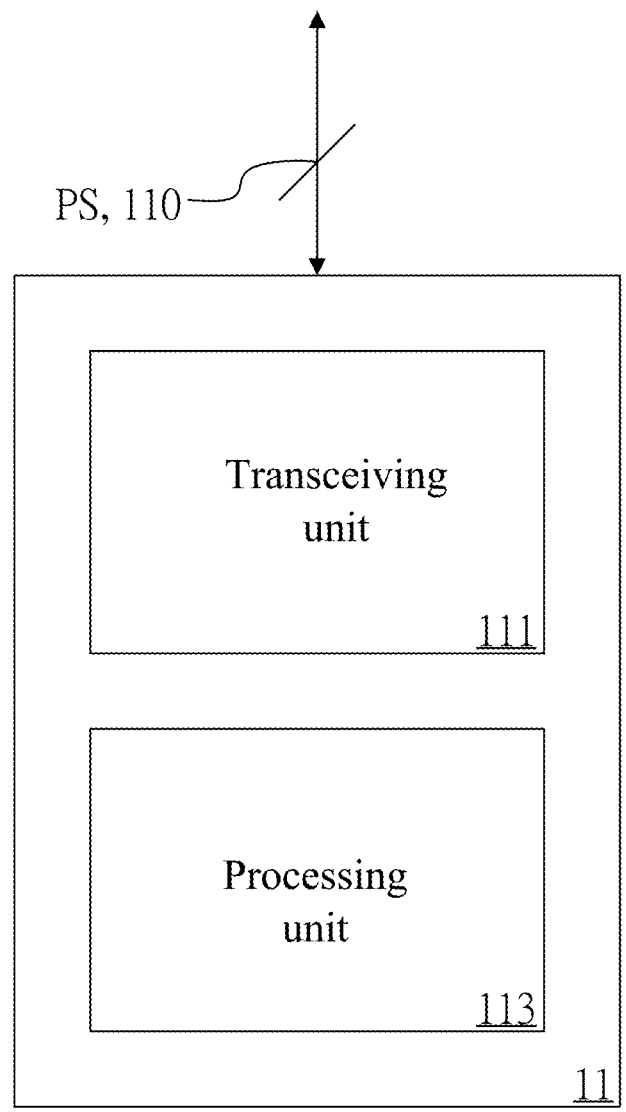
FIG. 1B is a block diagram of a base station according to the first embodiment of the present invention.
Figure 1C:
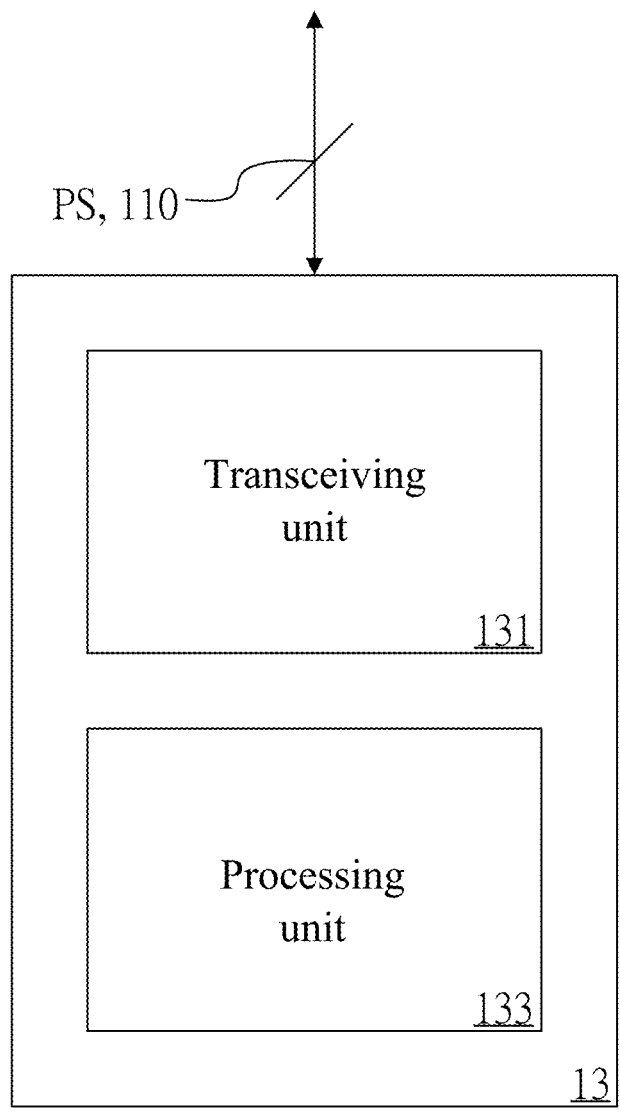
FIG. 1C is a block diagram of a first UE according to the first embodiment of the present invention.

Please refer to FIGS. 1A-1C. FIG. 1A is a schematic view of a direct communication network system 1 according to a first embodiment of the present invention. The direct communication network system 1 comprises a base station 11 and a first UE 13. FIG. 1B is a block diagram of a base station 11 according to the first embodiment of the present invention. The base station 11 comprises a transceiving unit 111 and a processing unit 113. FIG. 1C is a block diagram of the first UE 13 according to the first embodiment of the present invention. The first UE 13 comprises a transceiving unit 131 and a processing unit 133. Interactions among the individual elements will be further described herebelow.

Firstly, the processing unit 113 of the base station 11 broadcasts a pre-authorized setting PS via the transceiving unit 111, and the transceiving unit 131 of the first UE 13 receives the pre-authorized setting PS correspondingly. The pre-authorized setting PS mainly comprises legally authorized information that permits the first UE 13 to listen to corresponding messages of the direct communication network system 1, and correspondingly, the first UE 13 can listen to the messages of the base station 11 legally.

Then, when the processing unit 113 of the base station 11 broadcasts a first resource synchronization message 110 via the transceiving unit 111, the transceiving unit 131 of the first UE 13 can receive the first resource synchronization message 110, and the processing unit 133 of the first UE 13 can confirm an available network resource according to the first resource synchronization message 110 and directly communicate with a second UE 15 via the transceiving unit 131 accordingly.

In this way, even if the processing unit 133 of the first UE 13 determines via the transceiving unit 131 that a communication status between the first UE 13 and the base station 11 is an asymmetric communication (i.e., the first UE 13 can only receive messages from the base station 11, but cannot transmit a message to the base station 11), the first UE 13 still can accomplish resource synchronization with a single resource synchronization source (i.e., the base station 11) without the need of transmitting a resource synchronization related signal to the base station 11.

Figure 2:
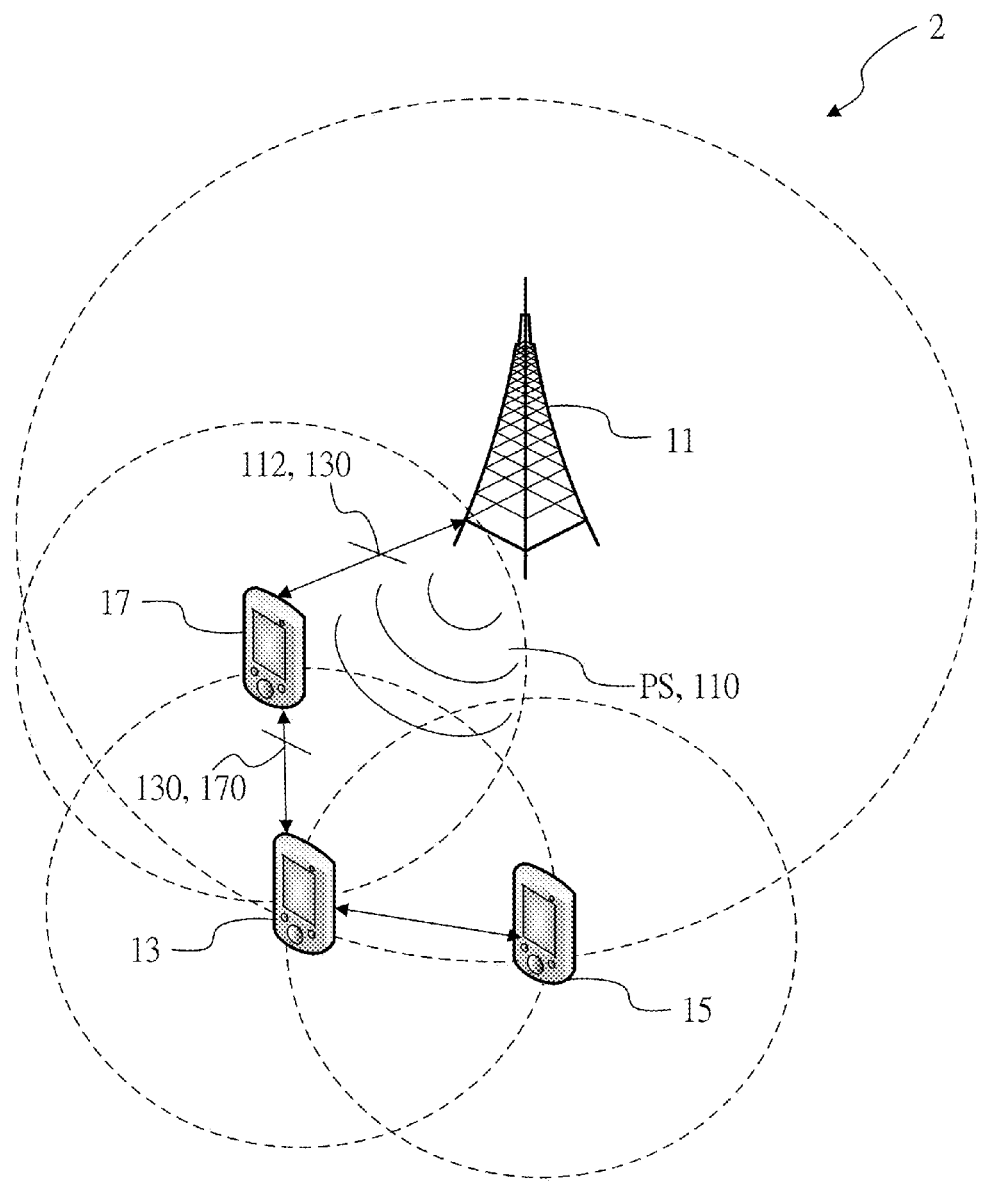
FIG. 2 is a schematic view of a direct communication network system according to a second embodiment of the present invention.

Please refer to FIG. 2, which is a schematic view of a direct communication network system 2 according to a second embodiment of the present invention. The architecture of the second embodiment is similar to that of the first embodiment, so elements bearing the same reference numerals also have the same functions and, thus, will not be further described herein. However, the second embodiment is mainly used to describe the processing mode in which the first UE 13 transmits messages to the base station 11 after the first UE 13 has accomplished the resource synchronization.

Specifically, the direct communication network system 2 further comprises a third UE 17, which mainly is a relay node. The third UE 17 will transmit a discovery signal 170 in the direct communication network system 2 to notify nearby UEs of the existence of the relay node.

Accordingly, after the discovery signal 170 of the third UE 17 is received by the transceiving unit 131 of the first UE 13, the processing unit 133 of the first UE 13 can determine that the third UE 17 is a relay node according to the discovery signal 170 and transmit a communication message 130, which indicates that the first UE 13 desires to communicate with the base station 11, to the base station 11 via the transceiving unit 131 and through the third UE 17.

It shall be particularly appreciated that, in a case where the third UE 17 is a common UE in the second embodiment, the processing unit 113 of the base station 11 may firstly determine that no message (e.g., a control message or a measurement message) from the first UE is received within a time period (not depicted), and then transmit a relay notification message 112 to the third UE 17 via the transceiving unit 111 to notify the third UE 17 to act as the relay node so that the first UE 13 communicates with the base station 11 via the third UE 17 subsequently.

Figure 3:
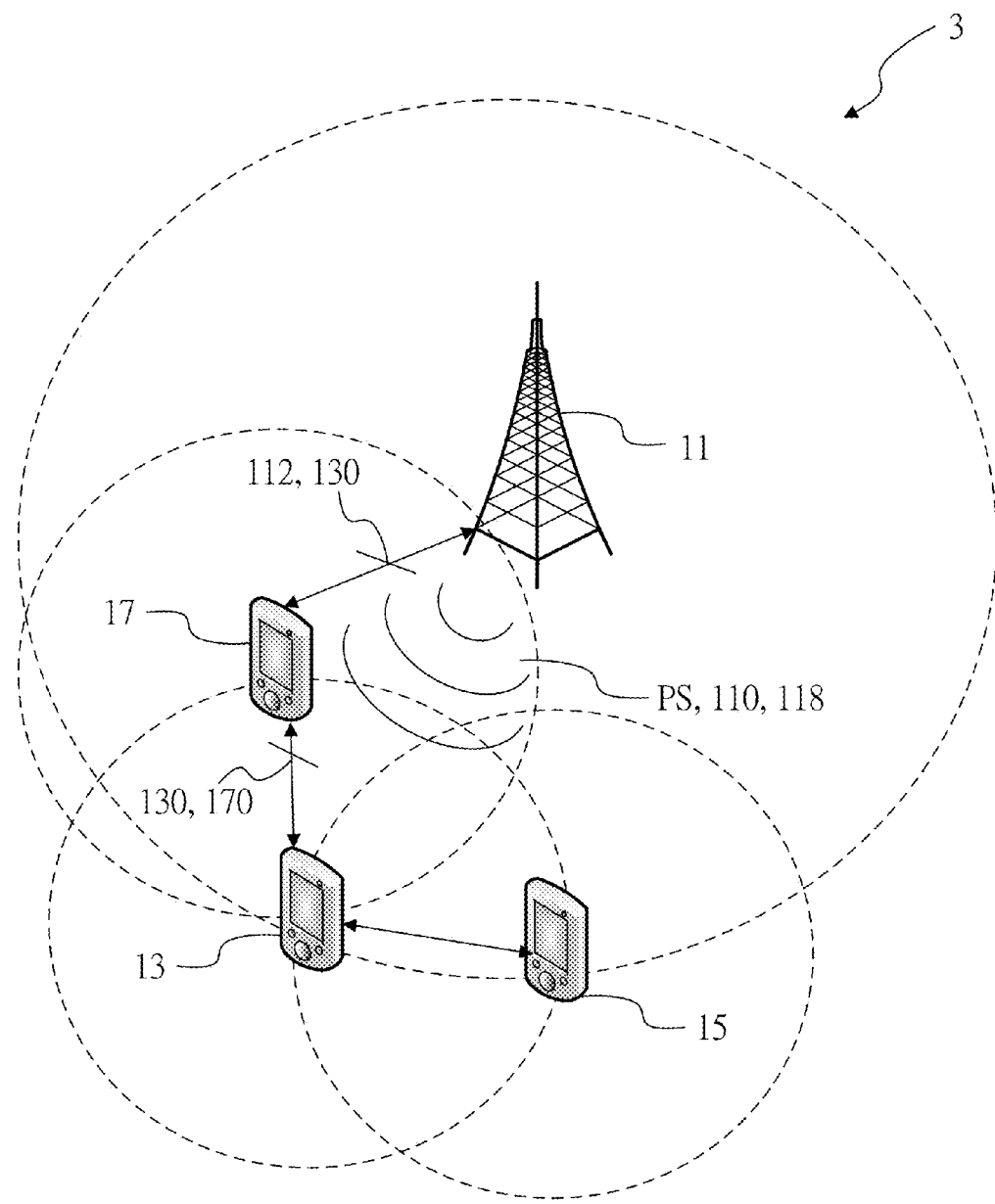
FIG. 3 is a schematic view of a direct communication network system according to a third embodiment of the present invention.

Please refer to FIG. 3, which is a schematic view of a direct communication network system 3 according to a third embodiment of the present invention. The architecture of the third embodiment is similar to that of the previous embodiments, so elements bearing the same reference numerals also have the same functions and, thus, will not be further described herein. However, the third embodiment is mainly used to describe how the base station 11 re-allocates the network resource for direct communications to the first UE 13 according to the report information.

Specifically, the communication message 130 further comprises a piece of direct communication status measurement information (not depicted), which is mainly used to report a network communication status between the first UE 13 and the second UE 15. Accordingly, the processing unit 113 of the base station 11 can determine according to the direct communication status measurement information whether the network resource used between the first UE 13 and the second UE 15 needs to be adjusted, and further decide a resource re-allocation message 118.

Then, the processing unit 113 of the base station 11 transmits the resource re-allocation message 118 to the first UE 13 via the transceiving unit 111. After the resource re-allocation message 118 is received by the transceiving unit 131 of the first UE 13, the processing unit 133 can directly re-communicate with the second UE 15 with updated network resource via the transceiving unit 131 according to the resource re-allocation message 118.

Figure 4:
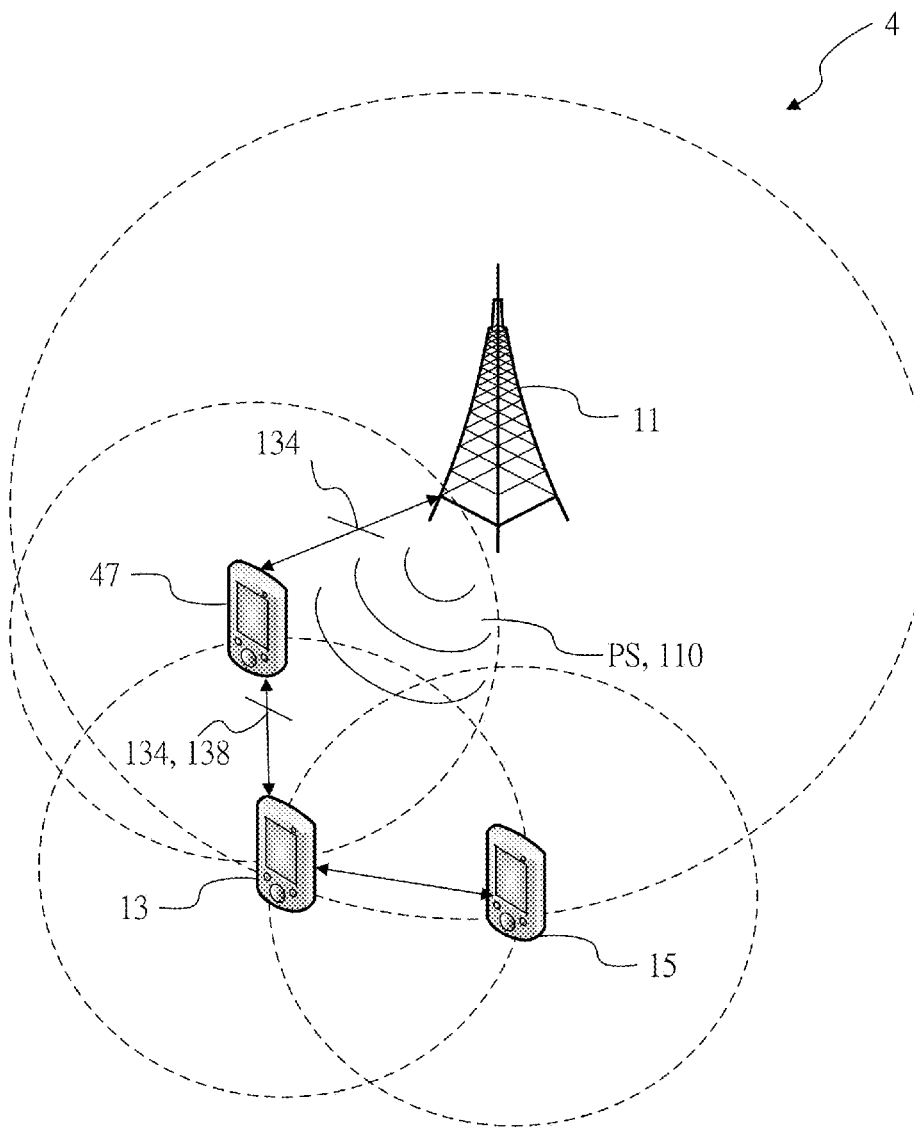
FIG. 4 is a schematic view of a direct communication network system according to a fourth embodiment of the present invention.

Please refer to FIG. 4, which is a schematic view of a direct communication network system 4 according to a fourth embodiment of the present invention. The architecture of the fourth embodiment is similar to those of the previous embodiments, so elements bearing the same reference numerals also have the same functions and, thus, will not be further described herein. However, the fourth embodiment is mainly used to describe the mode in which the first UE 13 decides the relay node by itself.

Specifically, the direct communication network system 4 further comprises a third UE 47. After having determined that the transceiving unit 131 does not connect to the base station 11 within a time period (not depicted), the processing unit 133 of the first UE 13 directly transmits a relay request message 138, which requests the third UE 47 to act as a relay node, to the third UE 47 via the transceiving unit 131.

Afterwards, after the relay function is activated by the third UE 47 according to the relay request message 138, the processing unit 133 of the first UE 13 can transmit a communication message 134 to the base station 11 via the third UE 47.

Figure 5:
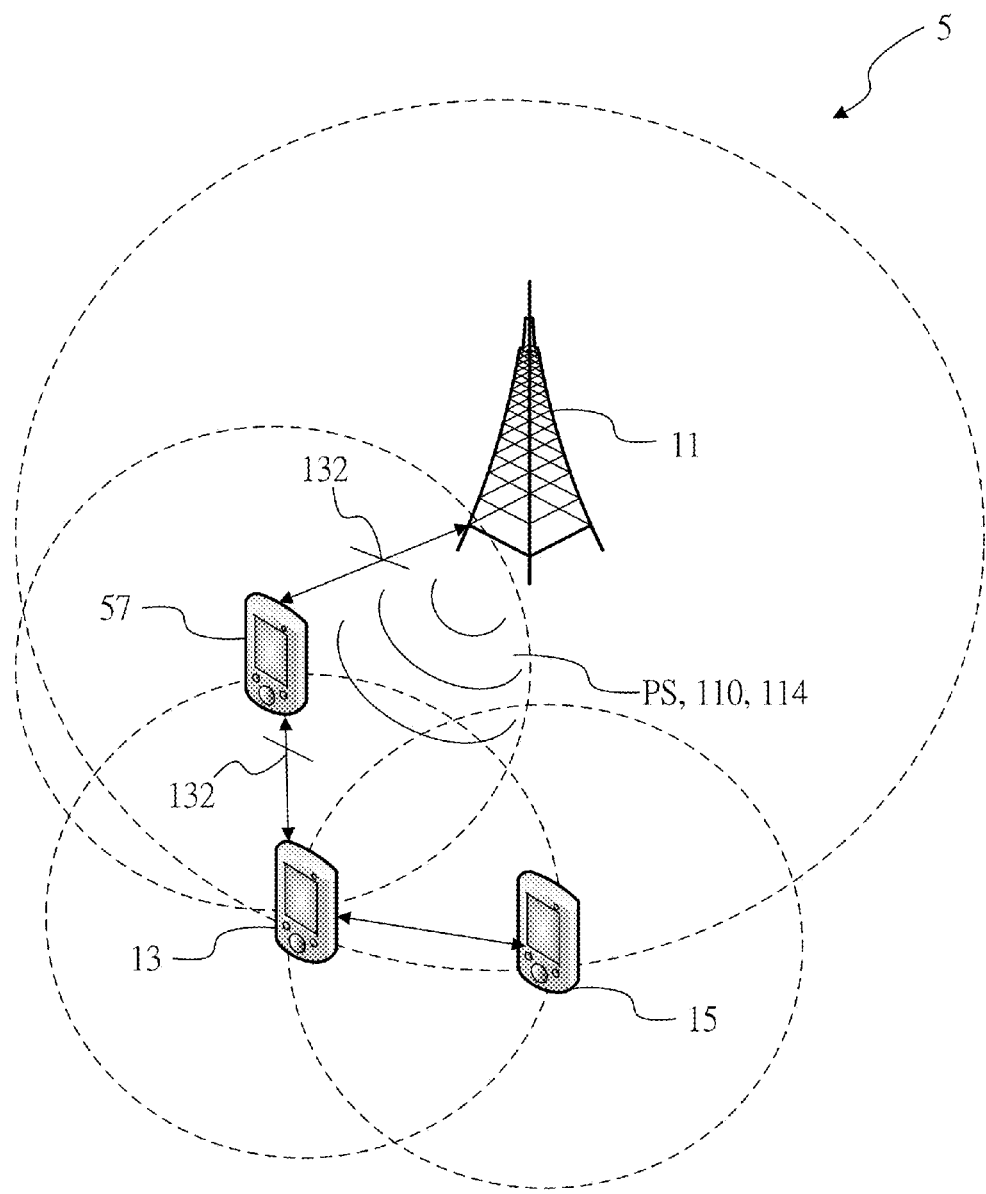
FIG. 5 is a schematic view of a direct communication network system according to a fifth embodiment of the present invention.

Please refer to FIG. 5, which is a schematic view of a direct communication network system 5 according to a fifth embodiment of the present invention. The architecture of the fifth embodiment is similar to those of the previous embodiments, so elements bearing the same reference numerals also have the same functions and, thus, will not be further described herein. However, the fifth embodiment is mainly used to describe how the base station 11 further notifies the first UE 13 of a suitable relay node for uploading data after the first UE 13 has accomplished the resource synchronization.

Firstly, in a case where the relay node can connect to the base station 11, the base station 11 can determine the position of the relay node in the direct communication network system 5. Because the base station 11 can transmit related messages for different directions or distances by using the technology of 3D Beam-forming, the base station 11 can transmit relay node lists corresponding to the different directions or distances in the respective directions or within the respective distances.

Accordingly, a relay node list 114 can be decided by the processing unit 113 of the base station 11 for one of a first direction, a first distance, and a combination thereof of the first UE 13. The relay node list 114 mainly comprises relay nodes adjacent to the first UE 13, and in the fifth embodiment, the relay node list 114 mainly records a third UE 57 as the relay node adjacent to the first UE 13.

Then, the relay node list 114 is broadcasted by the processing unit 113 of the base station 11 to the first UE 13 via the transceiving unit 111. After the relay node list 114 broadcasted by the base station 11 is received by the transceiving unit 131, the processing unit 133 of the first UE 13 can determine that the third UE 57 is the relay node according to the relay node list 114, and transmit a communication message 132 to the base station 11 via the transceiving unit 131 and through the third UE 57.

It shall be particularly appreciated that, the aforesaid technology of the present invention mainly emphasizes that the adjacent relay node is notified to the UE by using the position of the UE, and how to use the technology of 3D Beam-forming to determine the position of the UE can be readily understood by people skilled in the art and, thus, will not be further described herein.

Figure 6:
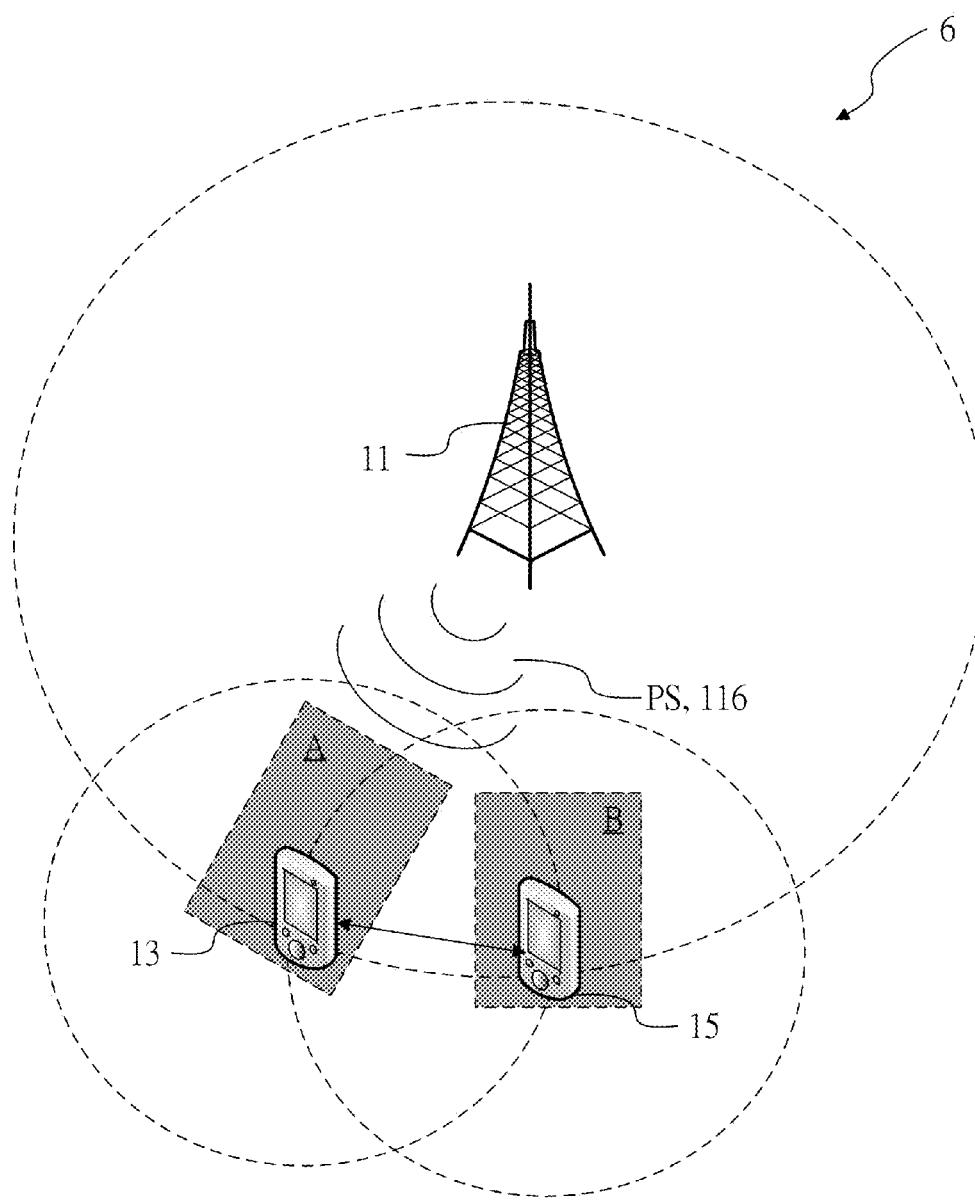
FIG. 6 is a schematic view of a direct communication network system according to a sixth embodiment of the present invention.

Please refer to FIG. 6, which is a schematic view of a direct communication network system 6 according to a sixth embodiment of the present invention. The architecture of the sixth embodiment is similar to those of the previous embodiments, so elements bearing the same reference numerals also have the same functions and, thus, will not be further described herein. However, the sixth embodiment is mainly used to describe direct communications between the first UE 13 with UEs in different network blocks.

In detail, the processing unit 113 of the base station 11 may further broadcast the pre-authorized setting PS via the transceiving unit 111 for one of the first direction, the first distance, and the combination thereof of the first UE 13. The pre-authorized setting PS may further comprise related information of a first communication region A where the first UE 13 is located, and the transceiving unit 131 of the first UE 13 receives the pre-authorized setting PS in the first communication region A.

Then, the processing unit 113 of the base station 11 may further broadcast a first resource synchronization message 116, which is exclusively used in the first communication region A, in the first communication region A via the transceiving unit 111, and the transceiving unit 131 of the first UE 13 may listen to the first resource synchronization message 116 in the first communication region A.

Accordingly, the processing unit 133 of the first UE 13 may directly communicate with the second UE 15 in the first communication region A according to the first resource synchronization message 116. In the sixth embodiment, the second UE 15 is located in a second communication region B, and directly communicates with the first UE 13 in different base station network blocks by using a second resource synchronization message (not depicted) obtained from the base station 11.

Figure 7:
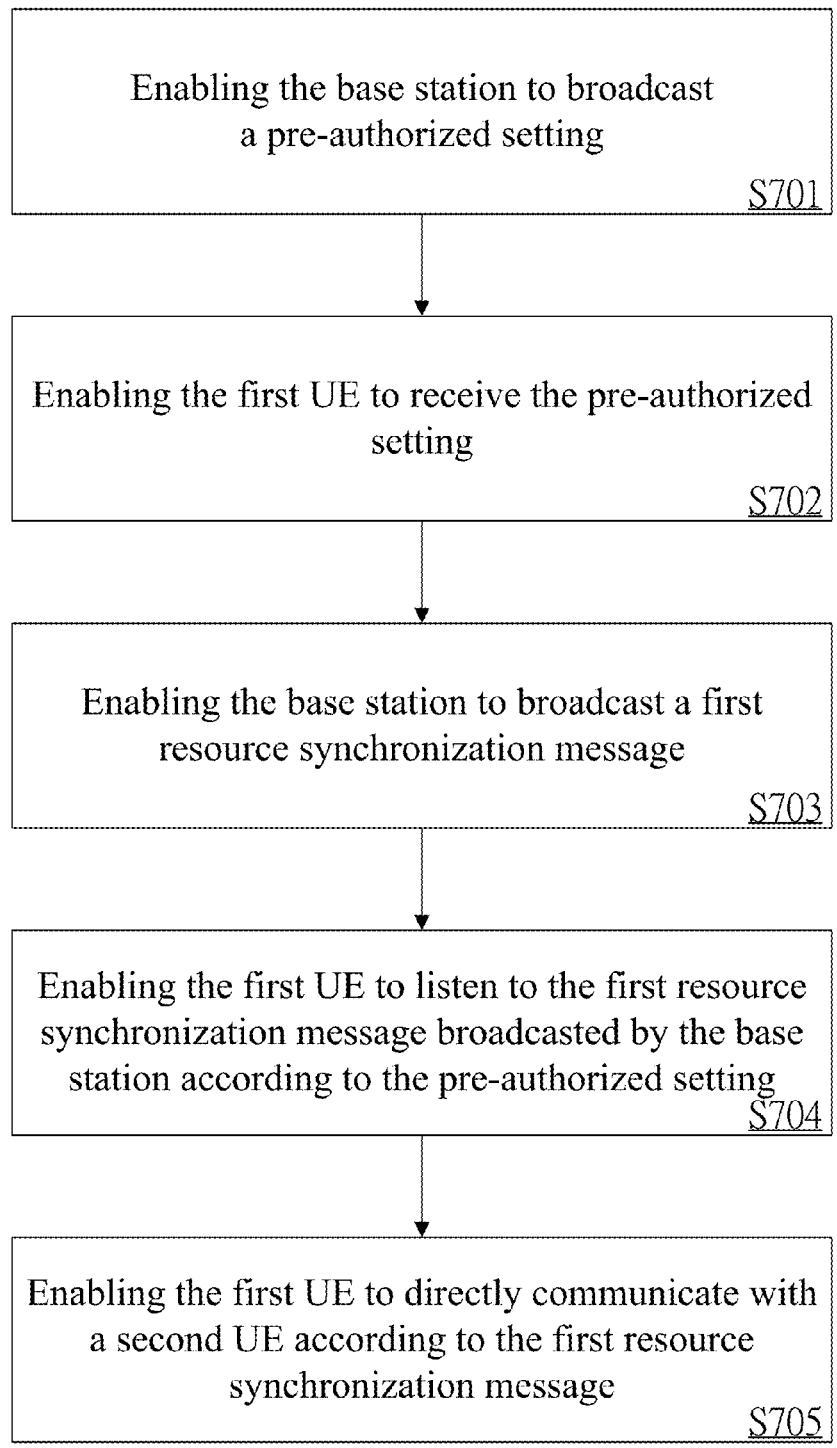
FIG. 7 is a flowchart diagram of a resource synchronization communication method according to a seventh embodiment of the present invention.

A seventh embodiment of the present invention is a resource synchronization communication method, a flowchart diagram of which is shown in FIG. 7. The method of the seventh embodiment is used in a direct communication network system (e.g., any of the direct communication network systems of the previous embodiments). The direct communication network system comprises a base station and a first UE. Detailed steps of the seventh embodiment are described as follows.

Firstly, step S701 is executed to enable the base station to broadcast a pre-authorized setting. Step S702 is executed to enable the first UE to receive the pre-authorized setting. The pre-authorized setting mainly comprises legally authorized information that permits the first UE to listen to corresponding messages of the direct communication network system.

Then, step S703 is executed to enable the base station to broadcast a first resource synchronization message. Step S704 is executed to enable the first UE to listen to the first resource synchronization message broadcasted by the base station according to the pre-authorized setting. Finally, step S705 is executed to enable the first UE to directly communicate with a second UE according to the first resource synchronization message.

Figure 8:
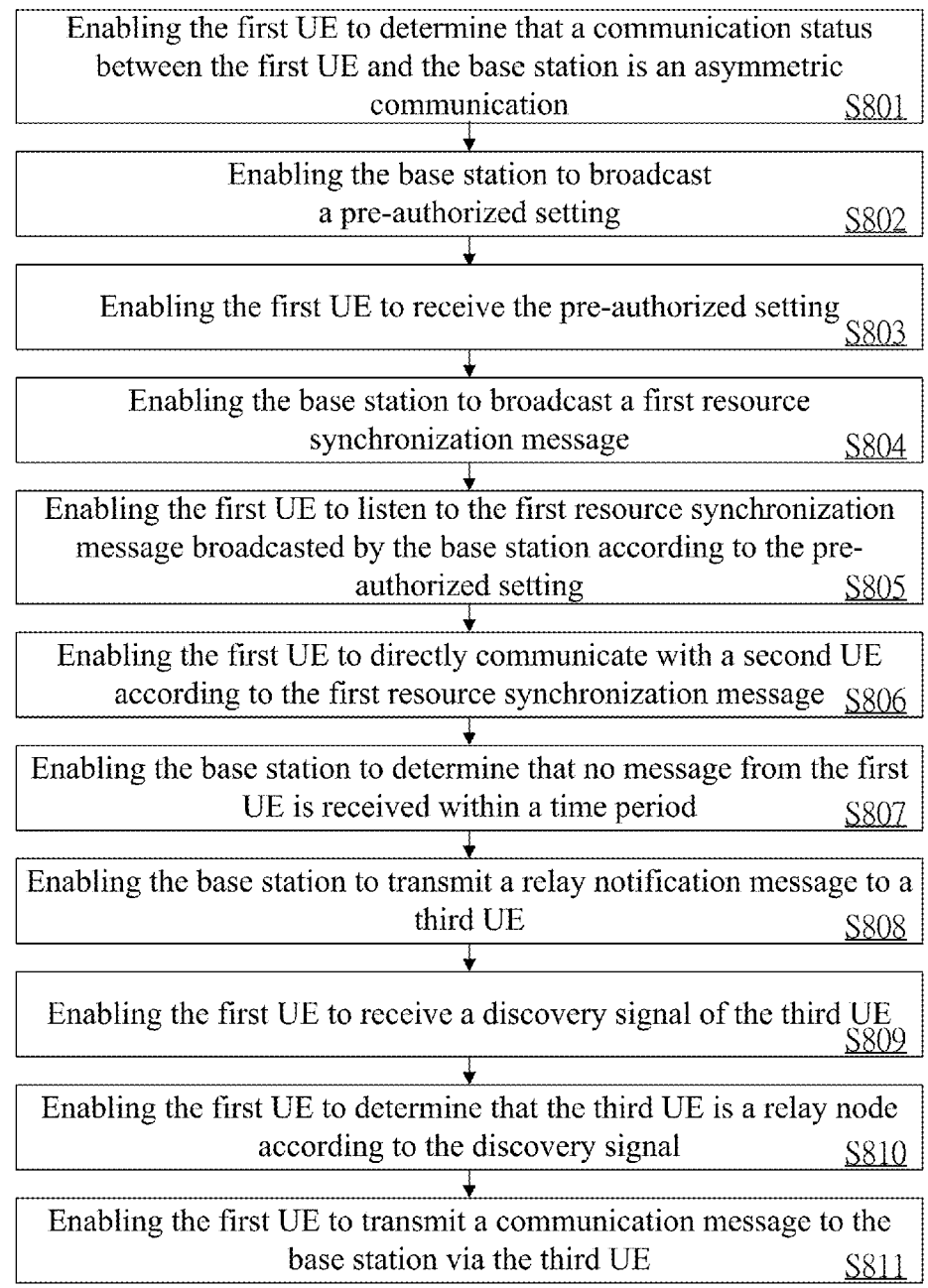
FIG. 8 is a flowchart diagram of a resource synchronization communication method according to an eighth embodiment of the present invention.

An eighth embodiment of the present invention is a resource synchronization communication method, a flowchart diagram of which is shown in FIG. 8. The method of the eighth embodiment is used in a direct communication network system (e.g., any of the direct communication network systems of the previous embodiments). The direct communication network system comprises a base station and a first UE. Detailed steps of the eighth embodiment are described as follows.

Firstly, step S801 is executed to enable the first UE to determine that a communication status between the first UE and the base station is an asymmetric communication. Step S802 is executed to enable the base station to broadcast a pre-authorized setting. Step S803 is executed to enable the first UE to receive the pre-authorized setting. Likewise, the pre-authorized setting mainly comprises legally authorized information that permits the first UE to listen to corresponding messages of the direct communication network system.

Then, step S804 is executed to enable the base station to broadcast a first resource synchronization message. Step S805 is executed to enable the first UE to listen to the first resource synchronization message broadcasted by the base station according to the pre-authorized setting. Step S806 is executed to enable the first UE to directly communicate with a second UE according to the first resource synchronization message.

Afterwards, step S807 is executed to enable the base station to determine that no message from the first UE is received within a time period. Step S808 is executed to enable the base station to transmit a relay notification message to a third UE. The relay notification message is configured to notify the third UE to act as the relay node. Step S809 is executed to enable the first UE to receive a discovery signal of the third UE.

Step S810 is executed to enable the first UE to determine that the third UE is a relay node according to the discovery signal. Finally, step S811 is executed to enable the first UE to transmit a communication message to the base station via the third UE. In this way, the first UE may also communicate with the base station through the relay node.

Figure 9:
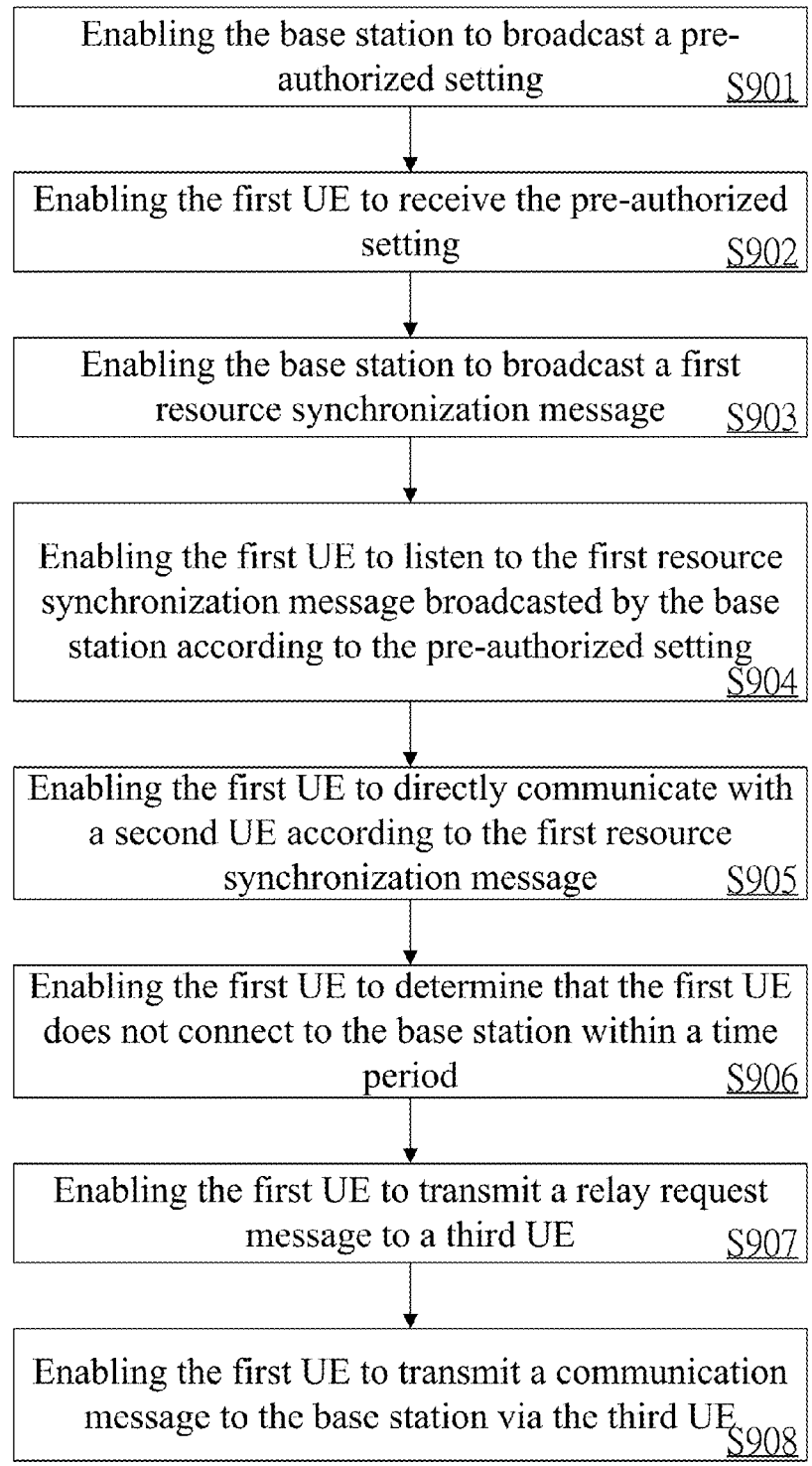
FIG. 9 is a flowchart diagram of a resource synchronization communication method according to a ninth embodiment of the present invention.

A ninth embodiment of the present invention is a resource synchronization communication method, a flowchart diagram of which is shown in FIG. 9. The method of the ninth embodiment is used in a direct communication network system (e.g., any of the direct communication network systems of the previous embodiments). The direct communication network system comprises a base station and a first UE. Detailed steps of the ninth embodiment are described as follows.

Firstly, step S901 is executed to enable the base station to broadcast a pre-authorized setting. Step S902 is executed to enable the first UE to receive the pre-authorized setting. The pre-authorized setting mainly comprises legally authorized information that permits the first UE to listen to corresponding messages of the direct communication network system. Then, step S903 is executed to enable the base station to broadcast a first resource synchronization message. Step S904 is executed to enable the first UE to listen to the first resource synchronization message broadcasted by the base station according to the pre-authorized setting. Step S905 is executed to enable the first UE to directly communicate with a second UE according to the first resource synchronization message.

Afterwards, step S906 is executed to enable the first UE to determine that the first UE does not connect to the base station within a time period. Step S907 is executed to enable the first UE to transmit a relay request message to a third UE. The relay request message is configured to request the third UE to act as a relay node. Finally, step S908 is executed to enable the first UE to transmit a communication message to the base station via the third UE.

Figure 10:
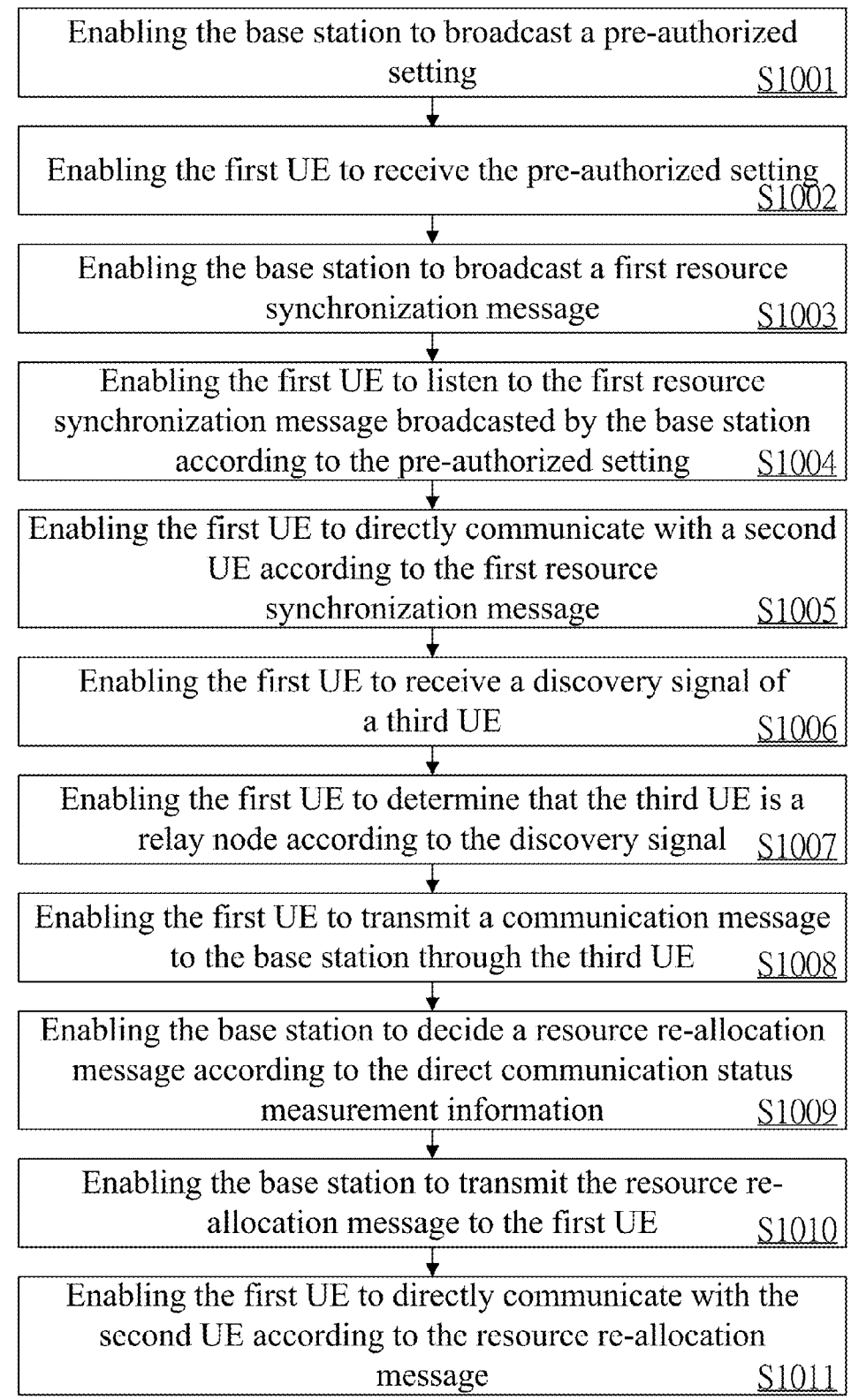
FIG. 10 is a flowchart diagram of a resource synchronization communication method according to a tenth embodiment of the present invention.

A tenth embodiment of the present invention is a resource synchronization communication method, a flowchart diagram of which is shown in FIG. 10. The method of the tenth embodiment is used in a direct communication network system (e.g., any of the direct communication network systems of the previous embodiments). The direct communication network system comprises a base station and a first UE. Detailed steps of the tenth embodiment are described as follows.

Firstly, step S1001 is executed to enable the base station to broadcast a pre-authorized setting. Step S1002 is executed to enable the first UE to receive the pre-authorized setting. The pre-authorized setting mainly comprises legally authorized information that permits the first UE to listen to corresponding messages of the direct communication network system.

Then, step S1003 is executed to enable the base station to broadcast a first resource synchronization message. Step S1004 is executed to enable the first UE to listen to the first resource synchronization message broadcasted by the base station according to the pre-authorized setting. Step S1005 is executed to enable the first UE to directly communicate with a second UE according to the first resource synchronization message.

Step S1006 is executed to enable the first UE to receive a discovery signal of a third UE. Step S1007 is executed to enable the first UE to determine that the third UE is a relay node according to the discovery signal. Step S1008 is executed to enable the first UE to transmit a communication message to the base station via the third UE.

Afterwards, Step S1009 is executed to enable the base station to decide a resource re-allocation message according to the direct communication status measurement information. Step S1010 is executed to enable the base station to transmit the resource re-allocation message to the first UE. Finally, step S1011 is executed to enable the first UE to directly communicate with the second UE according to the resource re-allocation message.

Figure 11:
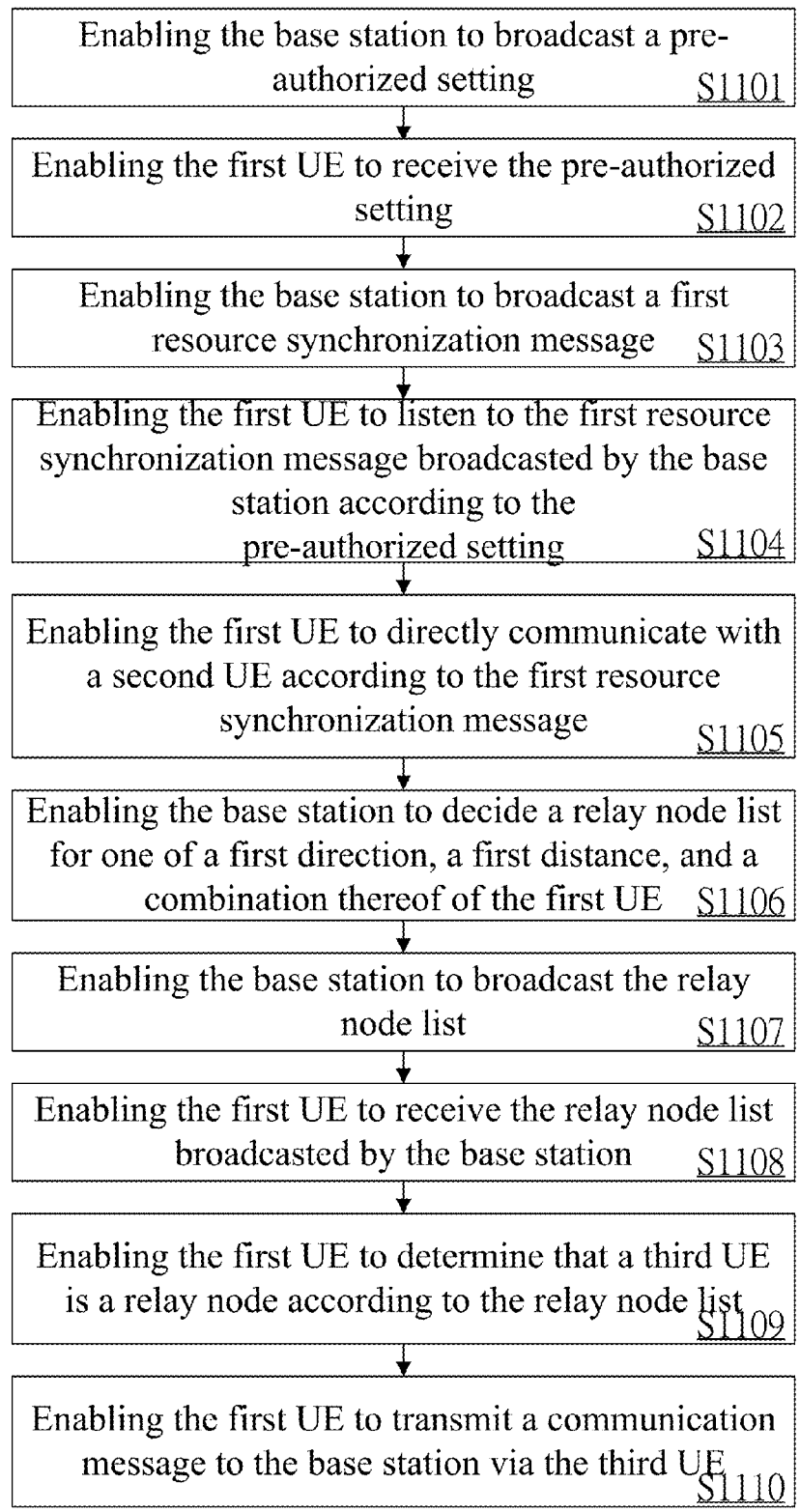
FIG. 11 is a flowchart diagram of a resource synchronization communication method according to an eleventh embodiment of the present invention.

An eleventh embodiment of the present invention is a resource synchronization communication method, a flowchart diagram of which is shown in FIG. 11. The method of the eleventh embodiment is used in a direct communication network system (e.g., any of the direct communication network systems of the previous embodiments). The direct communication network system comprises a base station and a first UE. Detailed steps of the eleventh embodiment are described as follows.

Firstly, step S1101 is executed to enable the base station to broadcast a pre-authorized setting. Step S1102 is executed to enable the first UE to receive the pre-authorized setting. Likewise, the pre-authorized setting mainly comprises legally authorized information that permits the first UE to listen to corresponding messages of the direct communication network system. Step S1103 is executed to enable the base station to broadcast a first resource synchronization message.

Then, step S1104 is executed to enable the first UE to listen to the first resource synchronization message broadcasted by the base station according to the pre-authorized setting. Step S1105 is executed to enable the first UE to directly communicate with a second UE according to the first resource synchronization message. Step S1106 is executed to enable the base station to decide a relay node list for one of a first direction, a first distance, and a combination thereof of the first UE.

Afterwards, step S1107 is executed to enable the base station to broadcast the relay node list. Step S1108 is executed to enable the first UE to receive the relay node list broadcasted by the base station. Step S1109 is executed to enable the first UE to determine that a third UE is a relay node according to the relay node list. Finally, step S1110 is executed to enable the first UE to transmit a communication message to the base station via the third UE.

Figure 12:
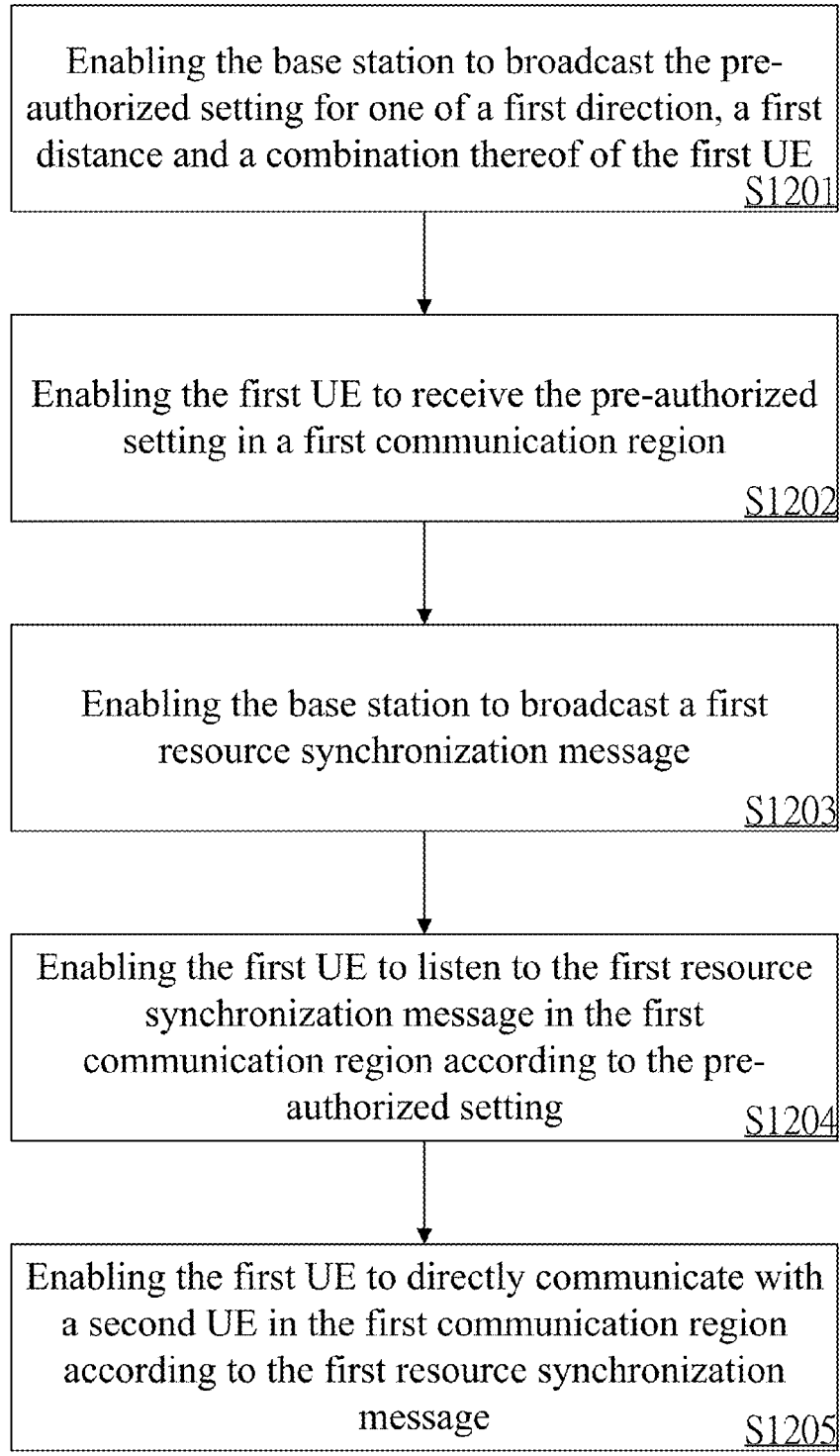
FIG. 12 is a flowchart diagram of a resource synchronization communication method according to a twelfth embodiment of the present invention.

A twelfth embodiment of the present invention is a resource synchronization communication method, a flowchart diagram of which is shown in FIG. 12. The method of the twelfth embodiment is used in a direct communication network system (e.g., any of the direct communication network systems of the previous embodiments). The direct communication network system comprises a base station and a first UE. Detailed steps of the twelfth embodiment are described as follows.

Firstly, step S1201 is executed to enable the base station to broadcast the pre-authorized setting for one of a first direction, a first distance and a combination thereof of the first UE. Step S1202 is executed to enable the first UE to receive the pre-authorized setting in a first communication region. Likewise, the pre-authorized setting mainly comprises legally authorized information that permits the first UE to listen to corresponding messages of the direct communication network system. Step S1203 is executed to enable the base station to broadcast a first resource synchronization message.

Then, step S1204 is executed to enable the first UE to listen to the first resource synchronization message in the first communication region according to the pre-authorized setting. Finally, step S1205 is executed to enable the first UE to directly communicate with a second UE in the first communication region according to the first resource synchronization message. The second UE directly communicates with the first UE in a second communication region by use of a second resource synchronization message.

According to the above descriptions, the direct communication network system and the resource synchronization communication method thereof of the present invention mainly allow a UE to directly listen to a resource synchronization message of a base station in an asymmetric communication status according to a pre-authorized setting so that resource synchronization can be accomplished to directly communicate with other UEs subsequently. In this way, the resource synchronization communication can be accomplished at a low hardware deployment cost, with a high network resource utilization factor and at a high resource synchronization accuracy rate under the existing hardware architecture.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A direct communication network system, comprising:
   a base station, being configured to broadcast a pre-authorized setting; and
   a first user equipment (UE), being configured to:
      determine that a communication status between the first UE and the base station is an asymmetric communication;
      receive the pre-authorized setting;
      listen to a first resource synchronization message broadcasted by the base station according to the pre-authorized setting; and
      directly communicate with a second UE according to the first resource synchronization message.

2. The direct communication network system of claim 1, wherein the first UE is further configured to:
   determine that the first UE does not connect to the base station within a time period;
   transmit a relay request message to a third UE, wherein the relay request message is configured to request the third UE to act as a relay node; and
   transmit a communication message to the base station via the third UE.

3. The direct communication network system of claim 1, wherein the first UE is further configured to:
   receive a discovery signal of a third UE;
   determine that the third UE is a relay node according to the discovery signal; and
   transmit a communication message to the base station via the third UE.

4. The direct communication network system of claim 3, wherein the base station is further configured to:
   determine that no message from the first UE is received within a time period; and
   transmit a relay notification message to the third UE, wherein the relay notification message is configured to notify the third UE to act as the relay node.

5. The direct communication network system of claim 3, wherein the communication message comprises a piece of direct communication status measurement information, and the base station is further configured to:
   decide a resource re-allocation message according to the direct communication status measurement information; and
   transmit the resource re-allocation message to the first UE;
   wherein the first UE is further configured to directly communicate with the second UE according to the resource re-allocation message.

6. The direct communication network system of claim 1, wherein the base station is further configured to decide a relay node list for one of a first direction, a first distance, and a combination thereof of the first UE, and the first UE is further configured to:
   receive the relay node list broadcasted by the base station;
   determine that a third UE is a relay node according to the relay node list; and
   transmit a communication message to the base station via the third UE.

7. The direct communication network system of claim 1, wherein the base station is further configured to broadcast the pre-authorized setting for one of a first direction, a first distance and a combination thereof of the first UE, and the first UE is further configured to:
   receive the pre-authorized setting in a first communication region;
   listen to the first resource synchronization message in the first communication region according to the pre-authorized setting; and
   directly communicate with the second UE in the first communication region according to the first resource synchronization message, wherein the second UE directly communicates with the first UE in a second communication region by use of a second resource synchronization message.

8. A base station for use in a direct communication network system, the direct communication network system further comprising a first UE, and the base station comprising:
   a transceiving unit; and
   a processing unit, being configured to:
      broadcast a pre-authorized setting via the transceiving unit so that the pre-authorized setting is received by the first UE; and
      broadcast a first resource synchronization message via the transceiving unit so that the first UE listens to the first resource synchronization message according to the pre-authorized setting and directly communicates with a second UE according to the first resource synchronization message;
   wherein a communication status between the first UE and the base station is an asymmetric communication.

9. The base station of claim 8, wherein the processing unit is further configured to determine that no message of the first UE is received by the transceiving unit within a time period, and transmit a relay notification message to a third UE via the transceiving unit, wherein the relay notification message is configured to notify the third UE to act as a relay node.

10. The base station of claim 8, wherein the transceiving unit is further configured to:
   receive a communication message of the first UE via a third UE, wherein the communication message comprises a piece of direct communication status measurement information;
   wherein the processing unit is further configured to:
   decide a resource re-allocation message according to the direct communication status measurement information; and
   transmit the resource re-allocation message to the first UE via the transceiving unit so that the first UE directly communicates with the second UE according to the resource re-allocation message.

11. The base station of claim 8, wherein the processing unit is further configured to:
decide a relay node list for one of a first direction, a first distance, and a combination thereof of the first UE,
broadcast the relay node list via the transceiving unit so that the first UE receives the relay node list broadcasted by the base station and determines that a third UE is a relay node according to the relay node list; and
receive a communication message of the first UE from the third UE via the transceiving unit.

12. The base station of claim 8, wherein the processing unit is further configured to:
broadcast the pre-authorized setting via the transceiving unit for one of a first direction, a first distance and a combination thereof of the first UE so that the pre-authorized setting is received by the first UE in a first communication region; and
broadcast the first resource synchronization message in the first communication region via the transceiving unit.

13. A first UE for use in a direct communication network system, the direct communication network system further comprising a base station, the first UE comprising:
a transceiving unit; and
a processing unit, being configured to:
determine via the transceiving unit that a communication status between the first UE and the base station is an asymmetric communication;
receive via the transceiving unit a pre-authorized setting broadcasted by the base station;
listen to a first resource synchronization message, which is broadcasted by the base station, via the transceiving unit according to the pre-authorized setting; and
directly communicate with a second UE via the transceiving unit according to the first resource synchronization message.

14. The first UE of claim 13, wherein the processing unit is further configured to:
determine that the first UE does not connect to the base station within a time period;
transmit a relay request message to a third UE via the transceiving unit, wherein the relay request message is configured to request the third UE to act as a relay node; and
transmit a communication message to the base station via the third UE.

15. The first UE of claim 13, wherein the processing unit is further configured to:
receive a discovery signal of a third UE via the transceiving unit;
determine that the third UE is a relay node according to the discovery signal; and
transmit a communication message to the base station via the transceiving unit and through the third UE.

16. The first UE of claim 15, wherein the communication message comprises a piece of direct communication status measurement information, the base station decides a resource re-allocation message according to the direct communication status measurement information; and the transceiving unit is further configured to:
receive the resource re-allocation message from the base station;
wherein the processing unit is further configured to:
directly communicate with the second UE according to the resource re-allocation message and via the transceiving unit.

17. The first UE of claim 13, wherein the base station decides a relay node list for one of a first direction, a first distance, and a combination thereof of the first UE, and the processing unit is further configured to:
receive via the transceiving unit the relay node list broadcasted by the base station;
determine that a third UE is a relay node according to the relay node list; and
transmit a communication message to the base station via the transceiving unit and through the third UE.

18. The first UE of claim 13, wherein the base station broadcasts the pre-authorized setting for one of a first direction, a first distance and a combination thereof of the first UE, and the processing unit is further configured to:
receive the pre-authorized setting in a first communication region via the transceiving unit;
listen to the first resource synchronization message in the first communication region according to the pre-authorized setting and via the transceiving unit; and
directly communicate with the second UE in the first communication region according to the first resource synchronization message and via the transceiving unit, wherein the second UE directly communicates with the first UE in a second communication region by use of a second resource synchronization message.

* * * * *